United States Patent [19]

Lee

[11] 3,753,773

[45] Aug. 21, 1973

[54] COATING OF POLY-PARA-HETEROCYCLIC-XYLENE POLYMER

[75] Inventor: Stuart M. Lee, Palo Alto, Calif.

[73] Assignee: North American Rockwell Corporation, El Segundo, Calif.

[22] Filed: Apr. 26, 1972

[21] Appl. No.: 247,623

Related U.S. Application Data

[63] Continuation-in-part of Ser. No. 67,458, Aug. 27, 1970, abandoned.

[52] U.S. Cl......... 117/161 UA, 260/2 R, 117/106 R
[51] Int. Cl............................................. C23c 13/04
[58] Field of Search ................ 117/106 R, 161 UH, 117/161 UN, 161 UA; 260/2, 30.2, 30.4, 32.4; 204/165, 177, 158

[56] References Cited
UNITED STATES PATENTS

| 3,453,275 | 7/1969 | Grindahl et al. | 260/2 R |
| 3,086,946 | 4/1963 | Brown | 260/2 R |
| 3,166,521 | 1/1965 | Howard | 117/161 UH |
| 3,318,728 | 5/1967 | Lilyquist | 117/161 UH |
| 3,379,803 | 4/1968 | Tittman et al. | 117/106 |
| 3,246,627 | 4/1966 | Loeb et al. | 117/106 |

Primary Examiner—Alfred L. Leavitt
Assistant Examiner—J. Massie
Attorney—L. Lee Humphries, H. Fredrick Hamann et al.

[57] ABSTRACT

A deposition process and product obtaining a coating on an object of a poly-para-heterocyclic-xylene polymer wherein a dimer is vaporized in a front portion of the chamber obtaining diradicals of para-xylylene, and deposited on a surface of the object in a third portion of the chamber thereby obtaining a coating of the poly-para-heterocyclic-xylene polymer on the surface of the object.

9 Claims, 1 Drawing Figure

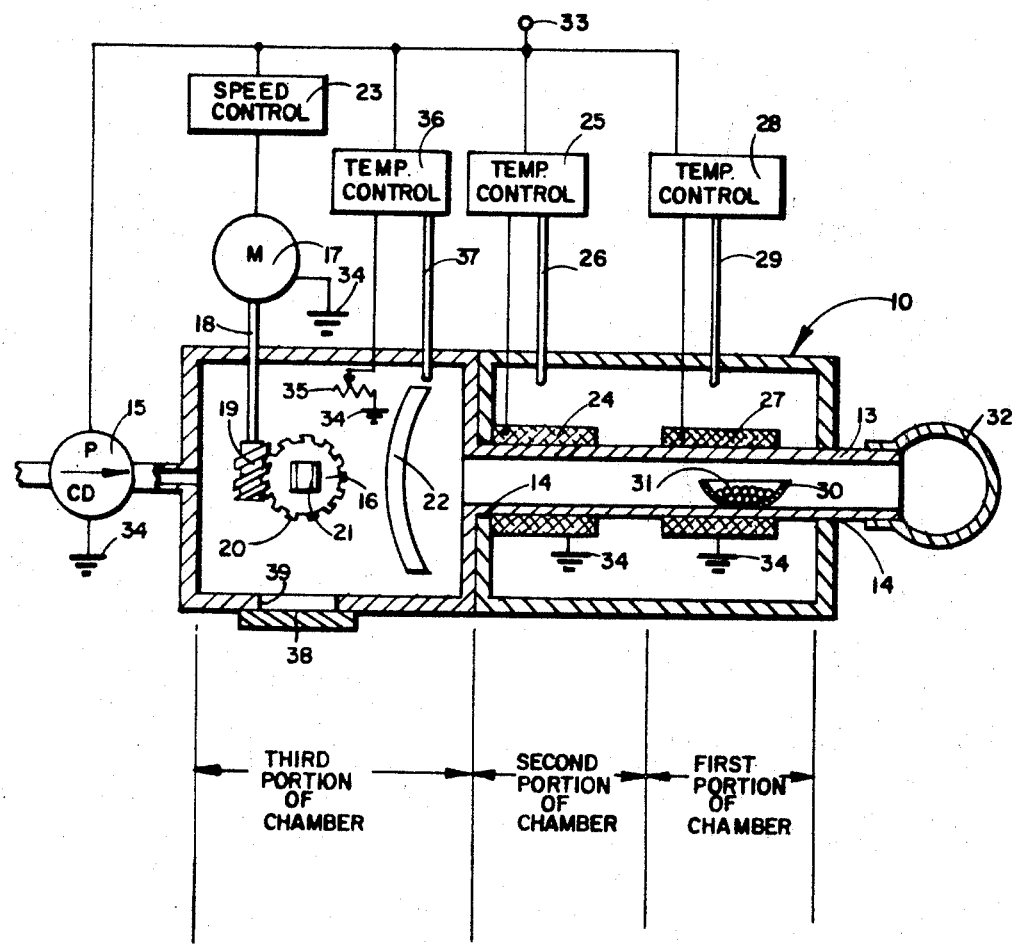

COATING OF POLY-PARA-HETEROCYCLIC-XYLENE POLYMER

COPENDING PARENT APPLICATION

This is a continuation-in-part of application Ser. No. 67,458, filed Aug. 27, 1970, copending with this application now abandoned.

BACKGROUND OF THE INVENTION

1. Field of Invention

The general field of invention is in the area of protective polymer coatings for electrical and electronic components and binders to strengthen the assembled, printed or deposited circuitry.

2. Prior Art

A process and composition for chemically coating various electronic members and the like are known. However, the various known products and processes possess certain limitations.

U.S. Pat. No. 3,472,79 to Tittmann et al, shows a process wherein di-p-xylylene is vaporized at temperatures of 100°–300°C, the vapors are then pyrolyzed at 400°–750°C to form the diradicals, and the diradicals are fed to a cooler deposition zone where condensation and polymerization take place.

U.S. Pat. No. 3,301,707 to Loeb et al, shows pyrolysis of cyclic dimers to produce diradicals, followed by condensation and polymerization of the diradicals to produce a coating of poly (p-xylylenes).

U.S. Pat. No. 3,311,668 to Spence et al, discloses that polymers of the xylylene family are used as coatings and encapsulating materials.

U.S. Pat. No. 3,288,728 to Gorham includes a brief summary of xylylene polymers from the work of Szwarc (1947) who produced poly-para-xylylene by pyrolytic polymerization of para-xylene at subatmospheric pressures. A subsequent condensation of the bi-valent para-xylylene radicals produced a polymeric film of para-xylylene. the patentee of this invention produces an improved poly-p-xylylene product which contains non-reactive aromatic substituents such as hydroxyl and alkoxyl groups.

U.S. Pat. No. 3,342,752 to Gorham shows a method for the preparation of linear homopolymers of p-xylylenes comprising the steps of heating a cyclo-di-p-xylylene having up to six aromatic nuclear substituent groups selected from the class consisting of hydrocarbon, oxyhydrocarbon, thiohydrocarbon, hydroxyl, halogen, nitro, nitrile, amine and mercapto-groups at a temperature between 450°–700°C. Poly-para-xylylene homopolymers have been developed that are capable of being deposited as ultrathin, chemically inert films. However, the commercially available poly-para-xylylene polymers suffer from two disadvantages such as temperature instability and chemical solvent attack.

Also long term stability of poly-para-xylylene in air is 140°F. In addition although various commercial reports state that poly-para-xylylene is not only chemically resistant but at temperatures below 300°F no known solvent for the polymer exists. Chemical solvent attack at room temperature have been tested and found that a large number of solvents attack this material under the conditions studied.

SUMMARY OF INVENTION

Therefore, the object of this invention is to overcome the temperature and solvent attack limitations on the poly-para-xylylene polymers. All promising high temperature organic polymers have one feature in common, that is rings containing non-carbon atoms which make the chain rigid, strong and heat stable. These heterocyclics contain nitrogen, oxygen or sulfur. Typical single or fused ring structures thereof include the benzimidazole, benzooxazole, benzothiazole, oxadiazole, thiazole, imidazole and quinolines. These aromatic heterocyclic single or fused rings provide very stable structures rendering the polymer highly resistant to heat and at present are the most refractory organic macromolecules.

These heterocyclic polymers possess in addition to high temperature resistance other desirable qualities and features such as chemical, radiation and abrasion resistance, improved physical, mechanical and electrical properties.

Such heterocyclic compounds, generally termed poly-para-heterocyclic-xylylene polymers when used for coating surfaces of various objects such as electronic assemblies overcome all the objectionable and disadvantageous properties inherent in prior art coatings.

A vacuum deposition process is used wherein a surface of an object is coated with a poly-para-heterocyclic-xylylene polymer. The coating process comprises a three step procedure. The first step involves sublimation or vaporization and consists of heating the para-heterocyclic-xylylene dimer in the first portion of a tube furnace chamber. A dimer of para-xylylene is heated under a substantially vacuum conditioned to its vaporization temperature between 50–500 degrees centigrade. The amount of dimer introduced here is directly related to the final coating thickness obtained.

The second step of the process involves pyrolyzing the vaporized dimer at temperatures between 100°–1000° Centigrade in the second portion of the chamber into monomeric para-xylylene diradicals. In this step the dimeric vapors enter the pyrolysis or cracking zone and are cleaved specifically at the methylene-to-methylene bond yielding monomeric para-xylylene diradicals. The temperature control of this zone is important and depends on the paraxylylene employed. Lower temperatures will not result in the desired cleavage, while elevated temperatures will cause pyrolysis and cleavage of other parts of the molecule and fail to give the desired cooling.

The third step of this process is executed in the third portion of the chamber in which the monomer diradicals of para-xylylene vapor enter below 100°C but above zero degrees centigrade. A coating of poly-para-heterocyclicxylylene polymer is deposited on said surfaces in this cooler deposition zone. To allow for an even distribution of the poly-para-heterocyclic-xylylene coating in the third portion of the deposition chamber objects to be coated were mounted on a rotatable platform which is turned at a slow rate of speed. In addition, a baffle may also be incorporated inside the third portion of the chamber for dispersing the diradicals of para-xylylene prior to deposition.

The equipment shown in FIG. 1 consisted of a two zone tube furnace and vapor tube, one section for subliming the dimer and another section for pyrolyzing. A chamber was attached and contained a baffle plate, and a rotatable platform.

Experimental variables based on diameter of the extension cylinder of the chamber, includes amount of vacuum, temperature of sublimation zone, length of sublimation zone, temperature of pyrolysis zone, length of pyrolysis zone, sample turning speed at 50 rpm approximately, and deposition chamber temperature below 100° centigrade. The described deposition method hereinbelow includes results in a polymeric coating having phenyl ring systems of para-xylylene, as well as polymeric coatings having hetero ring systems containing elements such as nitrogen, sulfur and oxygen and represented typically by the diazino type ring systems. The diazino type ring system may have two nitrogen atoms in its ring. On the other hand, a ring system containing one nitrogen atom of the pyridino type is possible. The diazino type can have nitrogen atoms in different positions yielding such chemicals as pyridazine which has nitrogen atoms in the 1, 2 positions, the pyrimidine ring that has nitrogen atoms in the 1,3 position, and the pyrazine ring which has nitrogen atoms in the 1, 4 position. Thus a diazine ring system can have nitrogen atoms in different positions on its ring thereby resulting in a variety of polymers and hence polymeric coatings. The ring system of the polymeric coating is also present in the dimer and is selected from the group consisting of at least one single ring system and at least one fused ring system containing at least one hetero atom.

BRIEF DESCRIPTION OF DRAWING

The FIGURE is a plan view schematic partially in cross-section and partially in elevation showing the processing chamber and its controls for depositing the inventive coating on a surface of an object.

EXEMPLARY EMBODIMENT

Referring to the FIGURE, a generally vacuum deposition environment is created in a chamber 10 for coating at least a surface of an object 21 with a poly-para-heterocyclic-xylylene polymer comprising a process wherein three different portions of the chamber are utilized under different environmental conditions.

Chamber 10 includes subchamber 11 which is divided into a first and second portion. A third portion 12 of the chamber is connected with subchamber 11 by means of having extension cylinder 13 of the third portion extending through opening 14 in the subchamber 11. A constant delivery pump 15 is attached at one extreme end to the third portion of the chamber for proving the requisite vacuum conditions in the chamber to approximately $5 \times 10^{-3}$ microns. Typically, a vacuum conditions of approximately $50 \times 10^{-3}$ microns are used.

Within the third portion of the chamber is located a rotatable platform 16. Motor 17 located outside of the third portion of the chamber has output shaft 18 on which is mounted worm gear 19. Worm gear 19 is coupled to teeth. 20 of the platform for driving same at a predetermined speed so that the surface of object 21 positioned on platform 16 is uniformly coated with the inventive coating material.

Baffle 22 is positioned within the third portion of the chamber for dispersing the plurality of diradicals of para-xylylene before the vapor of the poly-para-heterocyclic-xyxlylene polymer is deposited on the surface of object 21. However, it is pointed out that the use of a baffle 22 is optional and the process of depositing the desired coating may be carried out without the use of the baffle by utilizing the three basic steps of the process to be described hereinbelow.

Speed controller 23, generally a simple rheostat is connected in series with motor 17 to provide the desired speed of rotation of the rotatable platform.

Heater 35 positioned in the third portion of the chamber is used for maintaining this portion of the chamber at the required temperature below 100° C. but above 0° C., and typically at 25° C. A commercial temperature controller 36 having a metallic sensor wire 37 extending into the third portion of the chamber, and whose structure is known in the art, is connected in series with heater 35 for maintaining the desired temperature in the third portion of the chamber.

Heating coil 24 is circumjacent a portion of extension 13 within the second portion of the chamber and is used for providing a temperature range in the second portion between 100° and 1000° C. during the step of pyrolyzing at least one dimer therein for obtaining a plurality of diradicals of para-xylylene. Typically, a temperature of 600° is used in the second portion of the chamber. Control to coil 24 is provided by means of temperature controller 25 having sensor wire 26 extending into the second portion of the chamber, said controller 25 being series connected with coil 24.

Heating coil 27 is circumjacent a portion of extension 13 within the first portion of the chamber and may provide a temperature range in the first portion between 25° and 500° C. during the step of vaporizing at least one dimer of para-xylylene therein. Typically, a temperature of 100° C. may be used in the first portion of the chamber. Control to coil 27 is provided by means of temperature controller 28 having sensor wire 29 extending into the first portion of the chamber, said controller 28 being series connected with coil 27.

Quartz boat 30 is provided substantially near the opening of extension cylinder 13 in the vicinity of the first portion of the chamber. Dimer material 31 is positioned in quartz boar 30 prior to insertion of boat 30 into cylinder 13, and cap 32 is used to cover end of cylinder 13 to maintain the vacuum conditions in the chamber.

Electrical power is applied to input terminal 33 and electrically connected to one end of pump 15, speed controller 23, temperature controller 36, temperature controller 25, and to temperature controller 28. Electrical power return is provided at ground terminal 34 at pump 15, motor 17, heater element 34, return of coil 24, and return of coil 27 thereby completing the electrical circuits to the temperature controllers, motor speed control and vacuum pump servicing the chamber.

Dimer material 31 is so selected so that the polymeric coating on the surface of the object is a coating of a poly-para-heterocyclic-xylylene polymer, a homo-poly-para-heterocyclic-xylylene polymer, or a linear-homo-poly-para-heterocyclic-xylylene polymer having at least one single ring system and at least one fused ring system.

Hence, with the dimer positioned in the boat at its proper location, the sealing cap 32 in place, a vacuum of about $50 \times 10^{-3}$ microns created in the entire chamber by starting pump 15, and temperature controllers adjusted to obtain temperatures of 100° C. in the first chamber portion, 600° C. in the second chamber portion, and 25° C. in the third chamber portion, the dimer 31 is vaporized in cylinder 13 at the first portion of the chamber, communicated to the second portion of the chamber in cylinder 13 and pyrolyzed therein obtaining a plurality of diradicals of para-xylylene, and further propagated into the third portion of the chamber depositing said plurality of diradicals of para-xylylene on a surface of object 21 while the object is being rotatably driven on platform 16 for obtaining uniform deposition of said diradicals.

If baffle 22 is present in the third portion of the chamber the diradicals of para-xylylene are dispersed, under temperature conditions below 100° C., prior to deposition on the surface of object 21 for obtaining a more uniform coating of the poly-para-heterocyclic-xylylene polymer on said surface, or as stated above, a homo-poly-para-heterocyclic-xylylene polymer or a linear-homo-poly-para-heterocyclic-xylylene polymer thereon.

Therefore, what results from the use of this novel process is a product consisting of a substrate material and a coating of a poly-para-heterocyclic-xylylene-polymer on at least one surface of the substrate material. The coating thereon may also be of a homo-poly-para-heterocyclic-xylylene or of a linear-homo-poly-para-heterocyclic-xylylene and selected from the group consisting of at least one single ring system and at least one fused ring system.

After deposition of the desired polymeric coating, the power is disconnected from terminals 33 and 34, thereby allowing the chamber to cool and the atmospheric pressure restored to the chamber upon cessation of operation of pump 15. Door or panel 38 provided at opening 39 in third portion of chamber is opened and the coated object 21 removed through the same opening 39 that it was initially inserted. At this time cup 32 may be removed for removal of boat 30 to prepare the boat with additional dimer material for recycling of the process.

I claim:
1. In combination:
a substrate material; and
a coating of a poly-para-heterocyclic-xylylene-polymer on at least one surface of said substrate material.
2. The invention as stated in claim 1, wherein:
the polymeric coating is a homo-poly-para-heterocyclic-xylylene compound.
3. The invention as stated in claim 1, wherein:
the polymeric coating is a linear-homo-poly-para-heterocyclic-xylylene compound.
4. The invention as stated in claim 1, wherein:
the polymeric coating is selected from the group consisting of at least one single ring system and at least one fused ring system.
5. The invention as set forth in claim 2, wherein:
the polymeric coating is selected from the group consisting of at least one single ring system and at least one fused ring system.
6. The invention as set forth in claim 3, wherein:
the polymeric coating is selected from the group consisting of at least one single ring system and at least one fused ring system.
7. The invention as stated in claim 1, wherein:
the polymer coating has a ring system with nitrogen atoms at the 1 and 2 positions of its ring thereby resulting in a pyridazine compound.
8. The invention as stated in claim 1, wherein:
the polymer coating has a ring system with nitrogen atoms at the 1 and 3 positions of its ring thereby resulting in a pyrionidine compound.
9. The invention as stated in claim 1, wherein:
the polymer coating has a ring system with nitrogen atoms at the 1 and 4 positions of its ring thereby resulting in a pyrazine compound.

* * * * *